United States Patent [11] 3,627,727

| | | | |
|---|---|---|---|
| [72] | Inventor | Clarence E. Tholstrup Kingsport, Tenn. | |
| [21] | Appl. No. | 784,921 | |
| [22] | Filed | Dec. 18, 1968 | |
| [45] | Patented | Dec. 14, 1971 | |
| [73] | Assignee | Eastman Kodak Company Rochester, N.Y. | |

[54] SUBSTITUTED DICARBOXYLIC ACID DIHYDRAZIDES AND POLYOLEFIN COMPOSITIONS CONTAINING THEM
11 Claims, No Drawings

[52] U.S. Cl. .................................................. 260/45.8 N, 117/232, 260/45.9 R
[51] Int. Cl. .................................................. C08f 45/60
[50] Field of Search ............................................. 260/45.8 N, 45.9, 310; 117/232

[56] References Cited
UNITED STATES PATENTS

| | | | |
|---|---|---|---|
| 3,110,696 | 11/1963 | Dexter........................... | 260/45.8 |
| 3,117,104 | 1/1964 | Bown et al..................... | 260/45.9 |
| 3,438,935 | 4/1969 | Leu ............................... | 260/45.85 |
| 3,440,210 | 4/1969 | Blount, Jr. et al............. | 260/41 |
| 3,484,285 | 12/1969 | Hansen.......................... | 117/232 |
| 3,485,778 | 12/1969 | Oertel et al. .................. | 260/18 |
| 2,960,488 | 11/1960 | Tamblyn et al............... | 260/45.9 |

FOREIGN PATENTS

| | | | |
|---|---|---|---|
| 909,753 | 11/1962 | Great Britain................ | 260/45.9 |

OTHER REFERENCES
Stille et al., " Journal of Heterocyclic Chemistry," Vol. 3, No. 2, 1966, pages 155–157, QD400J6

*Primary Examiner*—Donald E. Czaja
*Assistant Examiner*—R. A. White
*Attorneys*—William T. French and Ronald J. Carlson

ABSTRACT:

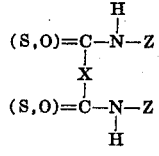

wherein X is divalent organic radical, and
Z is —NHR, —N(R¹)₂,
or

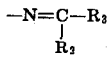

SUBSTITUTED DICARBOXYLIC ACID DIHYDRAZIDES AND POLOLEFIN COMPOSITIONS CONTAINING THEM

DISCLOSURE

This invention relates to certain substituted dicarboxylic acid dihydrazides and their use in polymeric compositions to inhibit the pro-oxidant effects of certain metals.

Various polymers are susceptible to oxidative degradation which appears to be promoted by heat and ultraviolet light. Such polymers include polyolefins, polyesters, polyamides, polyurethanes, polycarbonates, cellulose esters and the like. This degradation causes the polymers to become brittle and lose strength to the extent of mechanical failure. In order to inhibit this normal oxidative degradation it has been general practice to incorporate various antioxidants and ultraviolet light inhibitors into the polymers.

However, it has been found that these polymers, particularly polyolefins, become rapidly degraded and brittle when used in the presence of certain metals even though such polymers may contain the above-mentioned antioxidants and ultraviolet light inhibitors. Generally, certain salts of multivalent metals and the free metals themselves tend to promote this accelerated oxidative degradation. These metals include copper, cobalt, manganese, iron, nickel and chromium.

In accordance with this invention there has been found a new class of substituted dicarboxylic acid dihydrazide compounds which are useful as stabilizers in various polymers to minimize or eliminate the degradative effects of certain metals. These substituted dicarboxylic acid dihydrazides have the general formula $$\begin{array}{c} \text{H} \\ | \\ Y=C-N-Z \\ | \\ X \\ | \\ Y=C-N-Z \\ | \\ \text{H} \end{array}$$

wherein each Y is an oxygen or sulfur atom;

X is a substituted or unsubstituted divalent aryl radical, a divalent heterocyclic radical, a divalent cycloalkyl radical, a divalent dialkyl (cycloalkyl) radical or a divalent alkyl radical and each Z is a group represented by one of the following formulas 1. -NHR wherein R is a substituted or unsubstituted aryl radical or a substituted or unsubstituted heterocyclic radical;
2. -N($R^1$)$_2$ wherein each $R^1$ is an alkyl radical, a substituted or unsubstituted aryl radical, or a substituted or unsubstituted heterocyclic radical, at least one $R^1$ being an alkyl radical; or $$-N=C-R^3 \atop | \atop R^2$$

3. wherein $R^2$ is hydrogen or an alkyl radical while $R^3$ is alkyl radical, a cycloalkyl radical, a substituted or unsubstituted aryl radical, or a substituted or unsubstituted heterocyclic radical.

With reference to the above general formula: X is preferably a divalent phenyl radical, a divalent cycloalkyl radical having four to six carbon atoms, a divalent ($C_4$–$C_6$ cycloalkyl) dialkyl radical wherein each alkyl group has one to six carbon atoms, or a straight or branched-chain divalent alkyl radical having one to 24 carbon atoms; R is preferably a radical defined by one of the following formulas (1) 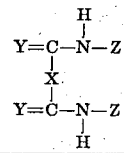

wherein $m$ is hydroxy, $C_1$–$C_{12}$ alkyl, nitro, amino or (lower alkyl) amino and ⓐ is an integer of 0 to 5;

(2) 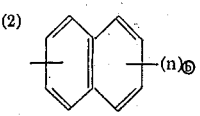

wherein $n$ is hydroxy, $C_1$–$C_{12}$ alkyl, nitro, amino or (lower alkyl) amino, and ⓑ is an integer of 0 to 4; or (3) 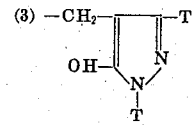

wherein each T is hydrogen, $C_1$–$C_{12}$ alkyl or phenyl.

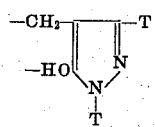

Each $R^1$ is preferably an alkyl radical having one to 24 carbon atoms or a radical as defined above with respect to R, at least one $R^1$ being an alkyl radical.

$R^2$ is preferably hydrogen or an alkyl radical having one to 24 carbon atoms.

$R^3$ is preferably an alkyl radical having one to 24 carbon atoms, a cycloalkyl radical having four to six carbon atoms, or a radical as defined above with respect to R.

Some specific examples of the above-described compounds are as follows:

Terephthalyl bis(2-phenylhydrazide)
Terephthalyl bis (2-benzylidenehydrazide)
Phthalyl bis (2-benzylidenehydrazide)
Malonyl bis(2-salicylidenehydrazide)
Sebacyl bis(2-salicylidenehydrazide)
Sebacyl bis[2-5-hydroxy-3-phenyl-4-pyrazolyl)methylene) hydrazide]
Succinyl bis(2-benzylidenehydrazide)
Glutaryl bis(2-benzylidenehydrazide)
Thiosebacyl bis(2-phenylhydrazide)
Thiosebacyl bis(2-benzylidenehydrazide)
Thiosebacyl bis[2-((5-hydroxy-3-phenyl-4-pyrazolyl) methylene)hydrazide]
Succinyl bis(2-benzylidenehydrazide)
Adipyl bis(2-benzylidenehydrazide)
Azelaoyl bis(2-benzylidenehydrazide)
Adipyl bis[2-(5-methylbenzylidene)hydrazide]

The above-described substituted dicarboxylic acid dihydrazides can generally be prepared by condensing an appropriate dicarboxylic acid dihydrazide with an appropriate aldehyde in accordance with known condensation reaction techniques. The dicarboxylic acid dihydrazides can be easily prepared, if not commercially available, by reacting the diester of the dicarboxylic acid with hydrazine. This reaction is exothermic and will generally proceed at room temperatures by merely mixing the reactants. The following examples will further illustrate the preparation of the subject compounds.

Example 1

Sebacyl bis(2-salicylidene hydrazide) may be prepared as follows:

85.5 g. (0.5 mole) of sebacic acid dihydrazide are dissolved in 2.1 of water maintained at about 90° C. 122 g. (1 mole) of salicyladehyde are dissolved in 1 l. of ethanol. The two solutions are combined with stirring and a heavy precipitate forms. The resulting mixture is cooled and filtered and the filtered material is washed with an ethanol-water solution. The crude product is then slurried in about 1.5 l. ethanol at about 45°–50° C. and then filtered. The final product is then obtained by drying in a vacuum oven at 85° C. This product is an off-white crystalline material with a melting point of 200°–201° C. and identified as sebacyl bis(2-salicylidene hydrazide).

Example 2

Adipyl bis[2-(5-methyl-2-hydroxybenzylidene) hydrazide]may be prepared using a similar procedure to that described in example 1 with the exception that adipic acid dihydrazide and 5-methyl-2-hydroxybenzaldehyde are used as the reactants rather than the reactants indicated therein.

Example 3

Phthalyl bis(2-benzylidenehydrazide) may be prepared from phthalic acid dihydrazide and benzaldehyde using procedure described in example 1.

Example 4

Sebacyl bis[(5-hydroxy-3-methyl-4-pyrazolyl-methylene) hydrazide]may be prepared from sebacic acid dihydrazide and 5-hydroxy-3-4-pyrazolyladehyde using a similar procedure as described in example 1.

Among the various polymeric materials which can be stabilized against the pro-oxidant effects of certain metals by the above described substituted dicarboxylic acid dihydrazides are polyolefins derived from α-mono-olefinic hydrocarbons having from two to about 10 carbon atoms. Examples of these α-mono-olefinic hydrocarbons are ethylene, propylene, 1-butene, decene, and the like. Both homopolymers and copolymers are included such as polyethylene, polypropylene, and copolymers of ethylene and propylene. While polyolefins having molecular weights above about 15,000 are particularly useful, those waxlike polyolefins having lower molecular weight can also be used. In addition, the polymeric compositions may comprise blends of more than one polyolefin. Since all these polyolefins are well know in the art further description is considered unnecessary.

The amount of the substituted dicarboxylic acid dihydrazides employed in the polyolefin compositions can be widely varied depending upon the particular polymer, the amount of pro-oxidant metals present, the conditions under which the polymer is to be employed and the degree of inhibition desired. All of this will be readily understood by those skilled in the art. However, for most end uses concentrations of the substituted dicarboxylic acid dihydrazides in the range of about 0.01 about 5.0 percent by weight of the polyolefin in the composition generally provides satisfactory results.

The substituted dicarboxylic acid dihydrazides may be incorporated into the polyolefins by any one of a number of well-known techniques, such as roll compounding, extrusion, solvent mixing and the like. An example of equipment which may be used is a Banbury mixer.

Other additives may also be blended with the polyolefins, either before, during, or after the substituted dicarboxylic acid dihydrazides are incorporated therein. These additives may include antioxidants, UV inhibitors, fillers, foaming agents, pigments, property improvers, other polymeric materials such as rubbery polymers (polyisobutylene, neoprene, nature rubber, polybutadiene, and the like), plasticizers, waxes, slip agents, antiblocking agents, anticorrosion agents, etc.

The resulting polyolefin compositions can be shaped into various articles by molding and extruding. A particularly desirable use for these compositions is as a wire coating material for copper conductors and the like. Application of the composition to the wire or conductor may be accomplished through conventional wire coating techniques.

For further illustration of this invention the following examples are presented.

Example 5

Sebacyl bis(2percent a compound of this invention and some prior art compounds are tested for their ability to inhibit the pro-oxidant effect of copper on polypropylene. The polypropylene used in the test contains 10 percent by weight polyisobutylene, 0.3 percent by weight 4,4'-butylidene-bis (6-t-butyl-m-cresol), 0.5 percent by weight dilauryl 3,3'-thiodipropionate and 0.05 percent by weight tris(nonylphenyl)phosphite. These additives are representative of those mentioned previously in the description.

Sample formulations of the above-described polypropylene containing copper dust and various compounds for inhibiting the pro-oxidant effect of copper are prepared by hot-roll milling the ingredients under heat for about 5 minutes. The sample formulations along with a control sample of the above described polypropylene are molded are formed into film strips measuring about 3 inches × 1/2 inch × 10 mils. These film strips are then suspended in a forced air oven maintained at about 160° C. The test for each film strip terminates when the strip becomes embrittled. The sample tested and the results obtained are shown in table A.

TABLE A

| Polypropylene (as described above) + 0.5 % of the following additive | Wt. % Cu Dust | Oven Life at 160° C. (Hrs.) |
|---|---|---|
| Nothing added | 0 | >150 |
| Nothing added | 1.5 | 10 |
| Oxnilide | 1.5 | 15 |
| Oxalyldihydrazide | 1.5 | 15 |
| Oxalyl bis(2-phenylhydrazide) | 1.5 | 38 |
| Lauroyl 2-salicylidenehydrazide | 1.5 | 6 |
| Sebacyl bis(2-salicylidene-hydrazide) | 1.5 | 230 |

As is apparent from the above data, the substituted dicarboxylic acid dihydrazide of this invention is not only effective for inhibiting the pro-oxidant effect of copper in polypropylene but is substantially more effective than prior art compounds known for this purpose.

Example 6

Certain of the substituted dicarboxylic acid dihydrazides of this invention are evaluated for their ability to inhibit the pro-oxidant effect of copper on polypropylene. The polypropylene used in the test contains 10 percent by weight polyisobutylene, 0.3 percent by weight 4,4'-butylidene bis(6-t-butyl-m-cresol), 0.5 percent by weight dilauryl 3,3'-thiodipropionate and 0.5 percent by weight tris(nonylphenyl)phosphite. The samples are prepared and tested under approximately the same conditions as described in example 5 with the following results being obtained.

Table B

| Polypropylene (as described above) + 0.5 % of the following additive | Wt. % Cu Dust | Oven Life at 160° C. (Hrs.) |
|---|---|---|
| Nothing added | 0 | 120 |
| Nothing added | 1.5 | 9 |
| Succinyl bis(2 hydrazide) | 1.5 | 85 |
| Glutaryl bis(2-benzylidene hydrazide) | 1.5 | 100 |
| Adipyl bis(2-benzylidene hydrazide) | 1.5 | 110 |
| Azelaoyl bis(2-benzylidene hydrazide | 1.5 | 100 |
| Sebacyl bis(2-benzylidene hydrazide) | 1.5 | 115 |
| Phthalyl bis(2-benzylidene hydrazide) | 1.5 | 75 |
| Terephthalyl bis(2-benzylidene hydrazide | 1.5 | 80 |
| Glutaryl bis(2-salicylidene hydrazide) | 1.5 | 200 |
| Sebacyl bis(2-salicylidene hydrazide) | 1.5 | 230 |
| Adipyl bis[2-(5-methylbenzylidene) hydrazide] | 1.5 | 145 |
| Adipyl bis[2-(5-methyl-2-hydroxy-benzylidene)hydrazide] | 1.5 | 195 |
| Sebacyl bis[(5-hydroxy-3-methyl-4-pyrazolyl-methylene)hydrazide] methyl-4-pyrazolyl-methylene) hydrazide] | 1.5 | 190 |

As is apparent from the above data, the substituted dicarboxylic acid dihydrazides are not only effective in inhibiting the pro-oxidant effects of copper but also, in some instances, confer additional oxidative stability to the compositions.

Example 7

Certain of the substituted dicarboxylic acid dihydrazides of this invention are evaluated as in examples 5 and 6 for their effectiveness in inhibiting the pro-oxidant effects of copper in polyethylene containing no additional additives. The polyethylene in this example has a melt index of 7 at 190° C. and 2.16 kg. The formulations and 10-mil film strips are prepared and tested in the same manner as described in examples 5 and 6. The samples tested and the results obtained are shown in table C.

Table C

| Polyethylene + 0.5 % of the following additive | Wt. % Cu Dust | Oven Life at 160° C. (Hrs.) |
| --- | --- | --- |
| None | 0 | 4 |
| None | 1.5 | <1 |
| Sebacyl bis(2-salicylidene hydrazide) | 0 | 5 |
| Sebacyl bis(2-salicylidene hydrazide) | 1.5 | >4 |
| Sebacyl bis[2-(5-methyl-2-hydroxy-benzylidene)hydrazide] | 1.5 | >5 |
| Sebacyl bis(2-benzylidene hydrazide) | 1.5 | >4 |

The data shown above indicates the effectiveness of the substituted dicarboxylic acid dihydrazides as inhibitors against the pro-oxidant effects of copper as well as effective stabilizers against oxidative degradation in the absence of copper and other additives in polyethylene.

Example 8

The substituted dicarboxylic acid dihydrazides of this invention are evaluated for effectiveness as inhibitors against the pro-oxidant effects of copper in copolymers of ethylene and propylene in the same manner as examples 5 and 6. The copolymer contains 0.3 percent 4,4'-butylidene-bis(6-t-butyl-m-cresol), 0.5 percent dilauryl-3,3'-thiodipropionate and 0.5 percent tris (nonylphenyl) phosphite and has a melt flow of about 2.8 at 230° C. and 2.6 kg. The formulations and 10-mil film strips are prepared and tested in the same manner as described in examples 5 and 6. The samples tested and the results obtained are shown in table D.

Table D

| Copolymer of ethylene and propylene (as described above) containing the following additive | Wt. % Cu Dust | Oven life at 160° C. (Hrs.) |
| --- | --- | --- |
| None | 0 | 180 |
| None | 1.5 | 2 |
| Sebacyl bis(2-benzylidene hydrazide) | 0 | 190 |
| Sebacyl bis(2-benzylidene hydrazide) | 1.5 | 150 |
| Sebacyl bis(2-salicylidene hydrazide) | 1.5 | 210 |
| Adipyl bis[2-(5-methyl-2-hydroxy-benzylidene)hydrazide] | 1.5 | 195 |

The above data indicate that the substituted dicarboxylic acid dihydrazides are effective stabilizers against normal oxidative degradation in the absence of copper as well as effective in inhibiting the pro-oxidant effects of copper.

It is further pointed out that the substituted dicarboxylic acid dihydrazides of this invention may advantageously be employed in combination with phenolic antioxidants and/or dialkyl esters of thiodialkanoic acids. Suitable phenolic compounds are described in detail in Canadian Pat. No. 686,064 to Tholstrup et al. Suitable dialkyl esters of thiodialkanoic acids include those wherein the alkyl moieties have four to 20 carbon atoms and the acid is either thiodipropionic acid or thiodibutyric acid. Phosphites such as those described in U.S. Pat. No. 3,039,993 may also be employed.

Thus, having described the invention in detail it will be understood that certain variations and modifications may be made without departing from the spirit and scope of the invention as described therein and in the appended claims.

I claim:

1. A composition stabilized against degradation due to the presence of a metal-containing substance comprising
    A. a polyolefin derived from an alpha-mono-olefinic hydrocarbon having two to 10 carbon atoms, and
    B. a stabilizing amount of a compound having the formula

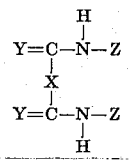

wherein each Y is an oxygen for sulfur atom; X is a divalent phenylene radical, a divalent cycloalkyl radical, a divalent dialkyl(cycloalky) radical, or a divalent alkyl radical; and each Z is a group represented by one of the following formulas
   1. -NHR wherein R is a hydroxy aryl radical, an alkyl aryl radical, a nitro aryl radical, an amino aryl radical, an alkyl amino aryl radical, an unsubstituted aryl radical or a heterocyclic radical having the formula

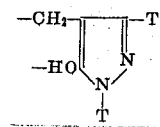

wherein each T is hydrogen, $C_1$-$C_{12}$ alkyl or phenyl,
   2. -N($R^1$)$_2$ wherein each $R^1$ is an alkyl radical, a hydroxy aryl radical, an alkyl aryl radical, a nitro aryl radical, an amino aryl radical, an alkyl amino aryl radical, an unsubstituted aryl radical, or a heterocyclic radical having the formula

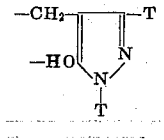

wherein each T is hydrogen, $C_1$-$C_{12}$ alkyl or phenyl, at least one $R^1$ being an alkyl radical, or 3. 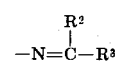

wherein $R^2$ is hydrogen or an alkyl radical and $R^3$ is an alkyl radical, a cycloalkyl radical, a hydroxy aryl radical, an alkyl aryl radical, a nitro aryl radical, an amino aryl radical, an alkyl amino aryl radical, an unsubstituted aryl radical, or a heterocyclic radical having the formula

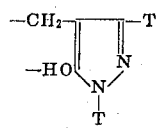

wherein each T is hydrogen, $C_1-C_{12}$ alkyl or phenyl.

2. A composition according to claim 1 wherein the polyolefin is polypropylene.

3. A wire coated with the composition of claim 1.

4. A composition according to claim 1 wherein the stabilizing compound is selected from:
1. succinyl bis(2-benzylidenehydrazide),
2. adipyl bis(2-benzylidenehydrazide),
3. sebacyl bis(2-benzylidenehydrazide),
4. terephthalyl bis(2-benzylidenehydrazide),
5. sebacyl bis(2-salicylidenehydrazide),
6. or a combination thereof.

5. A composition according to claim 4 wherein the stabilizing compound is succinyl bis(2-benzylidenehydrazide).

6. A composition according to claim 4 wherein the stabilizing compound is adipyl bis(2-benzylidenehydrazide).

7. A composition according to claim 4 wherein the stabilizing compound is sebacyl bis(2-benzylidenehydrazide).

8. A composition according to claim 4 wherein the stabilizing compound is terephthalyl bis(2-benzylidenehydrazide).

9. A composition according to claim 4 wherein the stabilizing compound is sebacyl bis(2-salicylidenehydrazide).

10. A composition according to claim 1 wherein the polyolefin is polyethylene.

11. A composition according to claim 1 wherein the polyolefin is a copolymer of ethylene and propylene.

* * * * *

UNITED STATES PATENT OFFICE
CERTIFICATE OF CORRECTION

Patent No. 3,627,727                    Dated December 14, 1971

Inventor(s)  Clarence E. Tholstrup

It is certified that error appears in the above-identified patent and that said Letters Patent are hereby corrected as shown below:

On the title page under "Abstract of Disclosure" insert ---A new class of substituted dicarboxylic acid dihydrazides is disclosed having utility in polymeric materials to inhibit the pro-oxidant effects of certain metals. They are particularly effective in polyolefins which come into contact with copper. The substituted dicarboxylic acid dihydrazides are represented by the formula---; On the title page, after "is" and before the word "divalent" insert ---a---; Column 2, lines 17-23, delete the formula; Column 2, lines 40 and 41, delete "Sebacyl bis[2-5-hydroxy-3-phenyl-4-pyrazolyl)methylene)hydrazide]" and insert ---Sebacyl bis[2-((5-hydroxy-3-phenyl-4-pyrazolyl)methylene)hydrazide]---; Column 2, line 69, delete "2.1" and insert ---2 1.---; Column 3, line 20, delete "5-hydroxy-3-4-pyrazolyladehyde" and insert ---5-hydroxy-3-methyl-4-pyrazolylaldehyde---; Column 3, line 59, delete "nature rubber" and insert ---natural rubber---; Column 3, line 72, delete "Sebacyl bis(2percent" and insert ---Sebacyl bis(2-salicylidenehydrazide),---; Column 4, line 10, delete second "are" and insert ---and---; Column 4, Table B, line 57, after "Succinyl bis(2" insert ---benzylidene---; Column 4, Table B, line 63, delete "Sebacyl bis(2-benzylidine" and insert ---Sebacyl bis(2-benzyldiene---; Column 4, Table B, line 70, after "Sebacyl bis(2-salicylidine" insert ---hydrazide)---; Column 4, Table B, lines 74 and 75, delete "methyl-4-pyrazolyl-methylene)hydrazide]"; Column 4, Table B, line 70, after "230" delete "hydrazide)"; Column 5, Example 8, line 48, delete "phosphite" and insert ---phosphate---; Column 6, Claim 1, first line after the first formula, delete "for" and insert ---or---; Column 6, Claim 1, second and third lines after the first formula, delete "dialkyl(cycloalky) radical" and insert ---dialkyl(cycloalkyl) radical---;

Signed and sealed this 4th day of July 1972.

(SEAL)
Attest:

EDWARD M. FLETCHER, JR.            ROBERT GOTTSCHALK
Attesting Officer                   Commissioner of Patents